(12) United States Patent
Gunther et al.

(10) Patent No.: US 8,397,090 B2
(45) Date of Patent: Mar. 12, 2013

(54) OPERATING INTEGRATED CIRCUIT LOGIC BLOCKS AT INDEPENDENT VOLTAGES WITH SINGLE VOLTAGE SUPPLY

(75) Inventors: Stephen H. Gunther, Beaverton, OR (US); Edward Burton, Hillsboro, OR (US); Anant Deval, Beaverton, OR (US); Stephan Jourdan, Portland, OR (US); Robert Greiner, Beaverton, OR (US); Mike Cornaby, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 925 days.

(21) Appl. No.: 11/636,425

(22) Filed: Dec. 8, 2006

(65) Prior Publication Data

US 2008/0136397 A1 Jun. 12, 2008

(51) Int. Cl.
*G06F 1/26* (2006.01)
*G06F 1/32* (2006.01)

(52) U.S. Cl. ......... 713/320; 713/300; 713/322; 713/324

(58) Field of Classification Search .................. 713/300, 713/320, 322, 324
See application file for complete search history.

(56) References Cited

U.S. PATENT DOCUMENTS

| 4,588,903 | A | 5/1986 | Johnson |
| 4,893,227 | A | 1/1990 | Gallios et al. |
| 6,150,724 | A | 11/2000 | Wenzel et al. |
| 6,424,128 | B1 | 7/2002 | Hiraki et al. |
| 6,452,247 | B1 | 9/2002 | Gardner |
| 6,577,535 | B2 | 6/2003 | Pasternak |
| 6,600,296 | B2 | 7/2003 | Hazucha |
| 6,693,412 | B2 | 2/2004 | Ruan et al. |
| 6,727,118 | B2 | 4/2004 | Lasky et al. |
| 6,754,086 | B2 | 6/2004 | Harris et al. |
| 6,788,035 | B2 | 9/2004 | Bassett et al. |
| 6,802,014 | B1 | 10/2004 | Suurballe |
| 6,803,805 | B2 | 10/2004 | Wang et al. |
| 6,804,632 | B2 * | 10/2004 | Orenstien et al. ............. 702/188 |
| 6,812,565 | B2 | 11/2004 | Nishimoto et al. |
| 6,864,600 | B2 * | 3/2005 | Malinovitch ..................... 307/70 |
| 6,867,502 | B2 | 3/2005 | Katagiri et al. |
| 6,873,136 | B2 | 3/2005 | Chagny |
| 6,895,520 | B1 * | 5/2005 | Altmejd et al. ............... 713/324 |
| 6,940,163 | B2 | 9/2005 | Piorun et al. |

(Continued)

FOREIGN PATENT DOCUMENTS

| EP | 1376692 A2 | 1/2004 |
| WO | 01/03279 A1 | 1/2001 |

(Continued)

OTHER PUBLICATIONS

"PCT/US2006/026381 Written Opinion", (Dec. 4, 2006), 11 pgs.

(Continued)

*Primary Examiner* — Jaweed A Abbaszadeh
(74) *Attorney, Agent, or Firm* — Blakely, Sokoloff, Taylor & Zafman LLP (57) ABSTRACT

Methods and apparatus to operate various logic blocks of an integrated circuit (IC) at independent voltages are described. In one embodiment, supply of power to one or more domains in an IC is adjusted based on an indication that power consumption by components of the corresponding domain is to be modified. Other embodiments are also described.

11 Claims, 5 Drawing Sheets

U.S. PATENT DOCUMENTS

| | | | |
|---|---|---|---|
| 7,026,797 B2 | 4/2006 | McCune, Jr. | |
| 7,032,117 B2* | 4/2006 | Kolinummi et al. | 713/300 |
| 7,034,344 B2 | 4/2006 | Pavier et al. | |
| 7,051,306 B2* | 5/2006 | Hoberman et al. | 716/6 |
| 7,062,933 B2* | 6/2006 | Burns et al. | 62/259.2 |
| 7,110,266 B1 | 9/2006 | Porter et al. | |
| 7,126,798 B2 | 10/2006 | Piorun et al. | |
| 7,178,044 B2* | 2/2007 | Pappalardo et al. | 713/300 |
| 7,181,631 B2* | 2/2007 | Volk | 713/300 |
| 7,202,648 B2 | 4/2007 | Gardner et al. | |
| 7,206,954 B2* | 4/2007 | Syed et al. | 713/324 |
| 7,218,085 B2 | 5/2007 | Abedinpour et al. | |
| 7,275,164 B2* | 9/2007 | Hottelet et al. | 713/300 |
| 7,284,137 B2* | 10/2007 | Clark et al. | 713/300 |
| 7,313,706 B2* | 12/2007 | Williams et al. | 713/300 |
| 7,366,926 B2* | 4/2008 | Si et al. | 713/300 |
| 7,383,449 B2* | 6/2008 | Nokkonen | 713/300 |
| 7,395,440 B2* | 7/2008 | Nokkonen | 713/300 |
| 7,482,792 B2 | 1/2009 | Burton et al. | |
| 7,523,336 B2* | 4/2009 | Grasso et al. | 713/330 |
| 7,555,664 B2* | 6/2009 | Sullam | 713/324 |
| 7,568,115 B2* | 7/2009 | Borkar et al. | 713/300 |
| 7,598,630 B2 | 10/2009 | Burton | |
| 7,664,971 B2* | 2/2010 | Oh | 713/300 |
| 7,698,576 B2* | 4/2010 | Narendra et al. | 713/300 |
| 7,949,887 B2 | 5/2011 | Gunther | |
| 8,037,445 B2* | 10/2011 | Poirier et al. | 716/136 |
| 2002/0109413 A1* | 8/2002 | Malinovitch | 307/87 |
| 2002/0152407 A1* | 10/2002 | Alia et al. | 713/300 |
| 2002/0184547 A1* | 12/2002 | Francis et al. | 713/322 |
| 2003/0126477 A1* | 7/2003 | Zhang et al. | 713/300 |
| 2003/0131268 A1* | 7/2003 | Kolinummi et al. | 713/300 |
| 2004/0019814 A1* | 1/2004 | Pappalardo et al. | 713/300 |
| 2004/0117678 A1* | 6/2004 | Soltis et al. | 713/320 |
| 2004/0158750 A1* | 8/2004 | Syed et al. | 713/320 |
| 2005/0040810 A1* | 2/2005 | Poirier et al. | 324/158.1 |
| 2005/0046400 A1* | 3/2005 | Rotem | 323/234 |
| 2005/0210905 A1* | 9/2005 | Burns et al. | 62/259.2 |
| 2005/0223251 A1* | 10/2005 | Liepe et al. | 713/322 |
| 2005/0289367 A1* | 12/2005 | Clark et al. | 713/300 |
| 2006/0006432 A1 | 1/2006 | Shiraishi et al. | |
| 2006/0117192 A1* | 6/2006 | Nokkonen | 713/300 |
| 2006/0149974 A1* | 7/2006 | Rotem et al. | 713/300 |
| 2006/0174149 A1* | 8/2006 | Hottelet et al. | 713/324 |
| 2006/0218424 A1* | 9/2006 | Abramovici et al. | 713/323 |
| 2006/0282692 A1* | 12/2006 | Oh | 713/300 |
| 2006/0288246 A1* | 12/2006 | Huynh | 713/320 |
| 2007/0023878 A1 | 2/2007 | Burton | |
| 2007/0192638 A1* | 8/2007 | Grasso et al. | 713/300 |
| 2007/0198863 A1* | 8/2007 | Bose et al. | 713/300 |
| 2007/0271473 A1* | 11/2007 | Hosomi | 713/300 |
| 2008/0028236 A1* | 1/2008 | Capps et al. | 713/300 |
| 2008/0028244 A1* | 1/2008 | Capps et al. | 713/324 |
| 2008/0082839 A1* | 4/2008 | Dibene et al. | 713/300 |
| 2009/0099705 A1* | 4/2009 | Harris | 700/300 |

FOREIGN PATENT DOCUMENTS

| | | |
|---|---|---|
| WO | 03/100831 A2 | 12/2003 |
| WO | 2004/102623 A2 | 11/2004 |
| WO | 2005/038920 A2 | 4/2005 |

OTHER PUBLICATIONS

Arabi, Tawfik, et al., "Per Die Temperature Programming for Thermally Efficient Integrated Circuit", US Application filed Jun. 29, 2006 assigned U.S. Appl. No. 11/478,472.

Arabi, Tawfik, et al., "Per Die Voltage Programming for Energy Efficient Integrated Circuit (IC) Operation", US Application filed Jun. 29, 2006 assigned U.S. Appl. No. 11/478,475.

Vera, Xavier, et al., "Clustered Variations-Aware Architecture", filed Dec. 22, 2005 assigned U.S. Appl. No. 10/562,189.

Burton, Edward, *IC With On-Die Power-Gating Circuit*, filed Jul. 29, 2006 assigned U.S. Appl. No. 11/193,276.

Abedinpour et al., "DC-DC Power Converter for Monolithic Implementation", vol. 4, Conference Record of the IEEE Industry Applications Conference, Rome, Italy, Oct. 2000, pp. 2471-2475.

Carley et al., "A Completely On-Chip Voltage Regulation Technique for Low Power Digital Circuits", Proceedings of 1999 International Symposium on Low Power Electronics and Design, 1999, pp. 109-111.

Kim, Jaeha, "Adaptive Supply Serial Links with Sub-1-V Operation and Per-Pin Clock Recovery", IEEE Journal of Solid-State Circuits, vol. 37, No. 11, Nov. 2002, pp. 1403-1413.

Abedinpour et al., "Monolithic Distributed Power Supply for a Mixes-Signal Integrated Circuit", vol. 3, Proceedings of the International Symposium on Circuits and Systems, IEEE, May 25-28, 2003, pp. III-308-III-311.

Hazucha et al., "A 233MHz, 80-87% efficient, integrated, 4-phase DC-DC converter in 90nm CMOS", 2004 Symposium on VLSI Circuits Digest Technical Papers, Jun. 17-19, 2004, pp. 256-257.

Office Action received for Chinese Patent Application No. 200710199132.1, mailed on Jun. 5, 2009, 7 pages of Office Action and 8 pages of English Translation.

Office Action received for German Patent Application No. 102007053796.6-53, mailed on May 21, 2010, 3 pages of Office Action and 2 pages of English Translation.

Second Office Action from foreign counterpart China Patent Application No. 200710199132.1, mailed Jun. 24, 2010, 12 pgs.

Third Office Action from foreign counterpart China Patent Application No. 200710199132.1, mailed Mar. 2, 2011, 11 pgs.

Fourth Office Action from foreign counterpart China Patent Application No. 200710199132.1, mailed Aug. 11, 2011, 15 pgs.

Office Action from foreign counterpart Germany Patent Application No. 10 2007 053 796.6-53, mailed Feb. 16, 2011, 3 pgs.

Office Action from foreign counterpart Germany Patent Application No. 10 2007 053 796.6, mailed Nov. 29, 2011, 5 pgs.

Fifth Office Action from foreign counterpart Chinese Application No. 200710199132.1 mailed Feb. 27, 2012.

Office Action in related German Application No. 10-2007-053-796.6 mailed Sep. 10, 2012, 3 pages.

* cited by examiner

OPERATING INTEGRATED CIRCUIT LOGIC BLOCKS AT INDEPENDENT VOLTAGES WITH SINGLE VOLTAGE SUPPLY

BACKGROUND

The present disclosure generally relates to the field of electronics. More particularly, an embodiment of the invention relates to operating integrated circuit (IC) logic blocks at independent voltages with a single source of voltage supply.

When providing power to IC dies, multiple power rails may be used to supply power to various components present on the die. To do this, some predefined amount of power resources may be allocated to each of the component. For example, some existing processors may operate all logic blocks present on the processor die at the same voltage and frequency. Alternatively, independent voltage supplies may be provided for each independent logic block. However, partitioning the supply of power in advance does not allow for dynamic power allocation. Also, the cost of providing these independent voltage supplies may be often prohibitive.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may provide techniques for adjusting supply of power to one or more domains in an IC based on a determination (or indication) that power consumption by components of the corresponding domain is to be modified. In one embodiment, each IC die may include a plurality of domains. The power consumed by one or more components present in each domain may be individually adjusted. Also, a single power supply (that may be external to the die) may supply power to power regulators that adjust the power consumption of the components within each domain.

Figure 1:
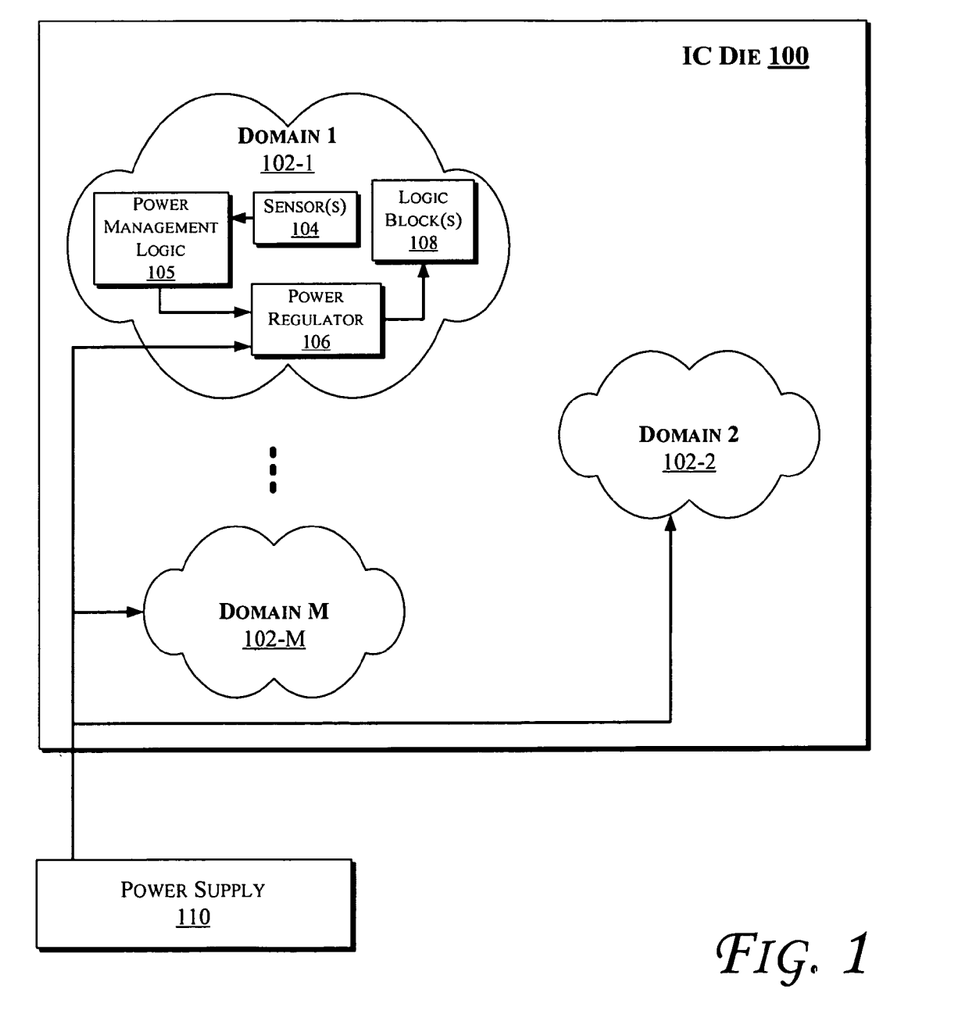
FIGS. 1 and 2 illustrate block diagrams of domains and other logic that may be present on IC dies, according to various embodiments.

Additionally, some embodiments may be provided in various environments, such as those discussed with reference to FIGS. 1-5. For example, FIG. 1 illustrates a block diagram of domains and other logic that may be present on an IC die 100, according to an embodiment. The die 100 may include one or more domains 102-1 through 102-M. Each of the domains 102-1 through 102-M may include various components, but for clarity, sample components are only shown with reference to the domain 102-1.

As illustrated in FIG. 1, each domain may include one or more sensors 104, a power management logic 105, a power regulator 106, and one or more logic blocks 108. The sensors 104 may sense variations (such as magnitude of semiconductor manufacturing process (P), operating voltage (V), temperature (T), and input vectors or values (I) variations (PVTI)) within the corresponding domain. In one embodiment, the sensors 104 may be coupled to one or more components of the corresponding domain (e.g., one or more of the logic blocks 108 within the domain 102-1). The power management logic 105 may be coupled to the sensors 104 and utilize sensed variations to cause adjustment(s) to the target operating frequency of one or more of the logic blocks 108. The power regulator 106 may adjust the supply of power provided by a power supply 110 (which may be external to the IC die 100 in one embodiment) to one or more components of the corresponding domain such as one or more of the logic blocks 108. In an embodiment, the power regulator 106 may include a power gating transistor (such as a power metal-oxide semiconductor field-effect transistor (MOSFET)), which may be utilized as a linear regulator by modulating its gate impedance. The power regulator 106 may also include inductors, capacitors, etc.

In one embodiment, the power management logic 105 (instead of or in conjunction with the detected values provided by the sensors 104) may determine whether the power consumption by one or more components of each of the plurality of domains 102 is to be modified based on one or more of an efficiency demand and/or a performance demand. Efficiency and/or performance demands may be configured by various techniques, such as predefined threshold values, analysis of input vectors or values, etc.

In an embodiment, the logic 105 may generate and transmit a signal to the power regulator 106 that corresponds to the target operating frequency of one or more components of the domain 102-1, such as the logic blocks 108. In some embodiments, the signal may be an indication to change the frequency to meet a desired power consumption target. In various embodiments, the transmitted signal may indicate a delta frequency change or it may be an indication to increase or decrease the frequency of the component. In one embodiment, the power regulator 106 may adjust the voltage supplied to the one or more components in response to the transmitted signal. In an embodiment, adjusting the supplied voltage may be made in conjunction with an operating frequency change, for example, where the level of both the supplied voltage and the operating frequency of one or more components are reduced. In some embodiments, the components (such as the logic blocks 108) may include one or more of: a processor core, a memory (such as a private or shared cache or a main or system memory), a digital signal processor engine, a co-processor, a vector processing engine, a floating point processor, a memory controller, an input/output controller, a graphics controller, a network processor, a router (e.g., which may be used to communicate between various components of the die 100 and/or between components of the die 100 and other dies (not shown)), and/or a graphics processor. Also, the die 100 may be provided in any suitable computing device such as a personal digital assistant (PDA), a mobile phone, a laptop computer, a desktop computer, a server computer (including a server utilizing blade modules, also referred to as a "blade server"), a workstation, etc. Furthermore, the die 100 may be provided in one or more components of the systems 400 of FIG. 4 and/or 500 of FIG. 5 in various embodiments.

Figure 2:
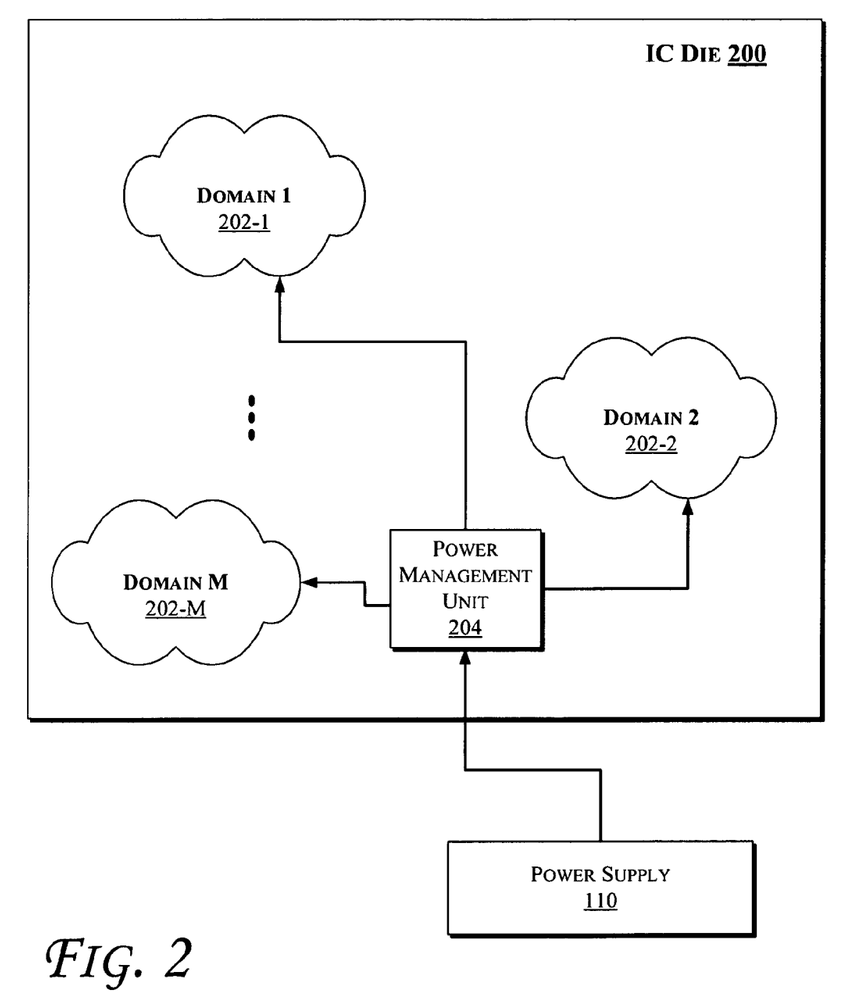

FIG. 2 illustrates a block diagram of domains present on an IC die 200, according to an embodiment. In an embodiment, domains 202-1 through 202-M (collectively referred to herein as "domains 202") may be similar to or the same as domains 102-1 through 102-M of FIG. 1. A power management unit 204 may be coupled to domains 202 and may adjust power consumption by components present in the domains 202 (such as the logic blocks 108 discussed with reference to FIG. 1).

Furthermore, domains 202-1 through 202-M may include more or less components than the domains 102-1 through 102-M of FIG. 1. For example, one or more of the domains 202 may include the sensors 104 and/or logic blocks 108. In an embodiment, the power management unit 204 may include a power regulator (such as the power regulator 106 discussed with reference to FIG. 1) for each of the domains 202. Alternatively, a power regulator (such as the power regulator 106 discussed with reference to FIG. 1) may be included in each of the domains 202. Also, the power supplied by the power supply 110 may be routed directly to the domains 202 (not shown) and the power management unit 204 may generate and transmit a signal to the power regulators within each domain 202 to adjust the power consumption of various components of the domains 202. Hence, in an embodiment, the power management unit 204 may perform the operations discussed herein with reference to the power management logic 105 for all domains of the IC die 200. This embodiment may allow for power management decisions to be made while considering the state and goal for all components of the die 200 rather than individual domains such as the embodiment discussed with reference to FIG. 1. Alternatively, the power management unit 204 may solely consider individual domain state and goals for components within each domain and cause the corresponding power regulator (which may be provided within the unit 204 and/or domains 202) to adjust the power consumption by various components in the domains 202.

Figure 3:
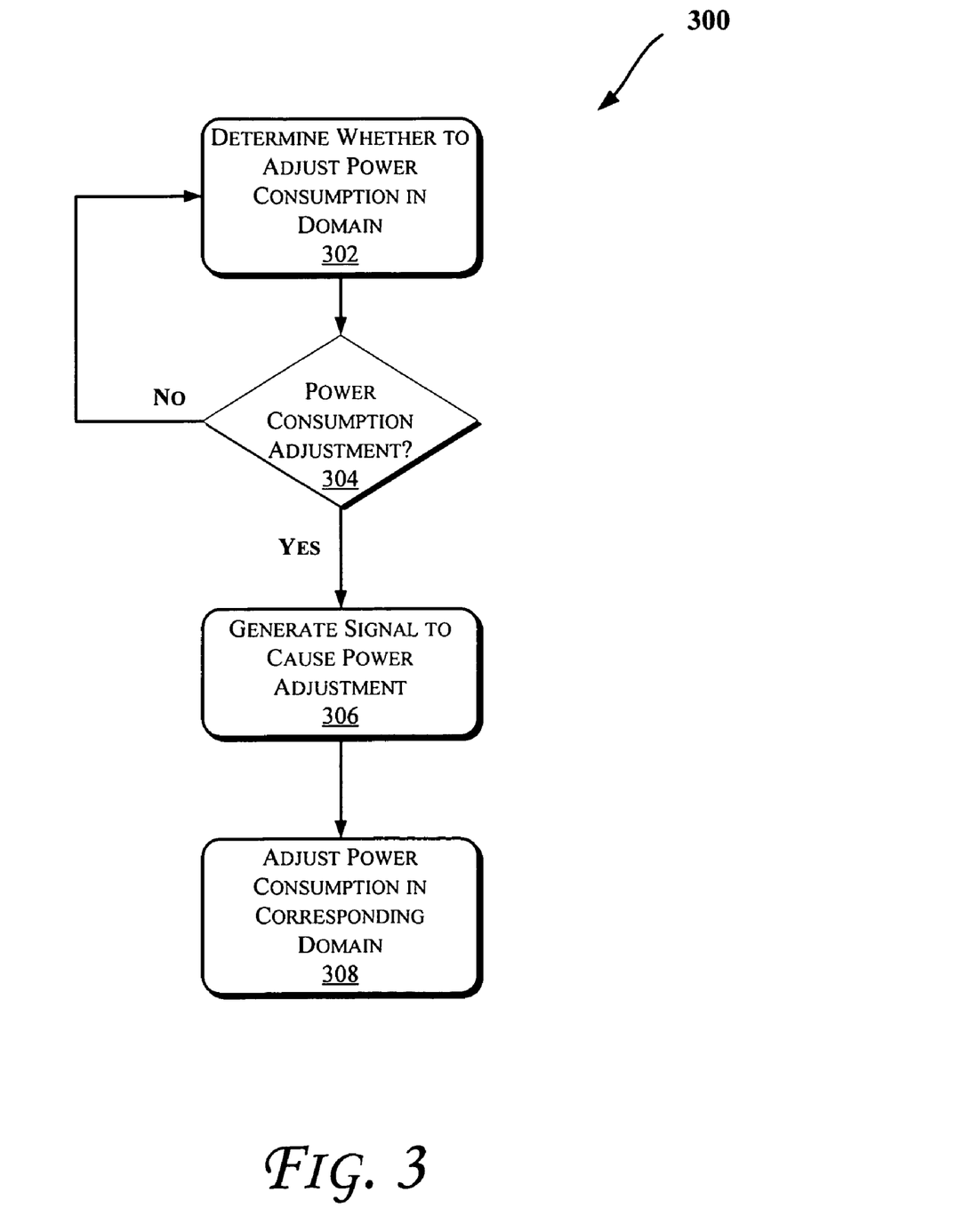
FIG. 3 illustrates a flow diagram of a method, according to an embodiment.

FIG. 3 illustrates a flow diagram of a method 300 to adjust power consumption in a domain, according to an embodiment. In one embodiment, various components discussed with reference to FIGS. 1-2, 4, and 5 may be utilized to perform one or more of the operations discussed with reference to FIG. 3. For example, the method 300 may be used to adjust power consumption of the logic blocks 108 discussed with reference to FIG. 1.

Referring to FIGS. 1-3, at an operation 302, it is determined whether to adjust the power consumption of one or more components present in a domain of an IC die. For example, the power management logic 105, power regulator 106, and/or the power management unit 204 may be utilized at operation 302 to adjust the power consumption of logic blocks 108 such as discussed with reference to FIGS. 1 and 2. At an operation 304, if power consumption is not to be adjusted, the method 300 returns to operation 302. Otherwise, if power consumption is to be adjusted, at an operation 306, a signal may be generated to cause the power adjustment. For example, the logic 105 and/or the power management unit 204 may generate a signal to indicate to the power regulator 106 (which may be provided within the unit 204 and/or domains 102 or 202) that power consumption of a corresponding component is to be adjusted. As discussed with reference to FIGS. 1 and 2, the generated signal may correspond to the target operating frequency of the component in one embodiment. At an operation 308, the power consumption may be adjusted in the corresponding domain. For example, the power regulator 106 may adjust the power consumption of the logic blocks 108 in accordance with a signal generated by the logic 105 and/or 204. In one embodiment, the power regulator 106 may adjust the voltage supplied to the component in response to the generated signal.

Figure 4:
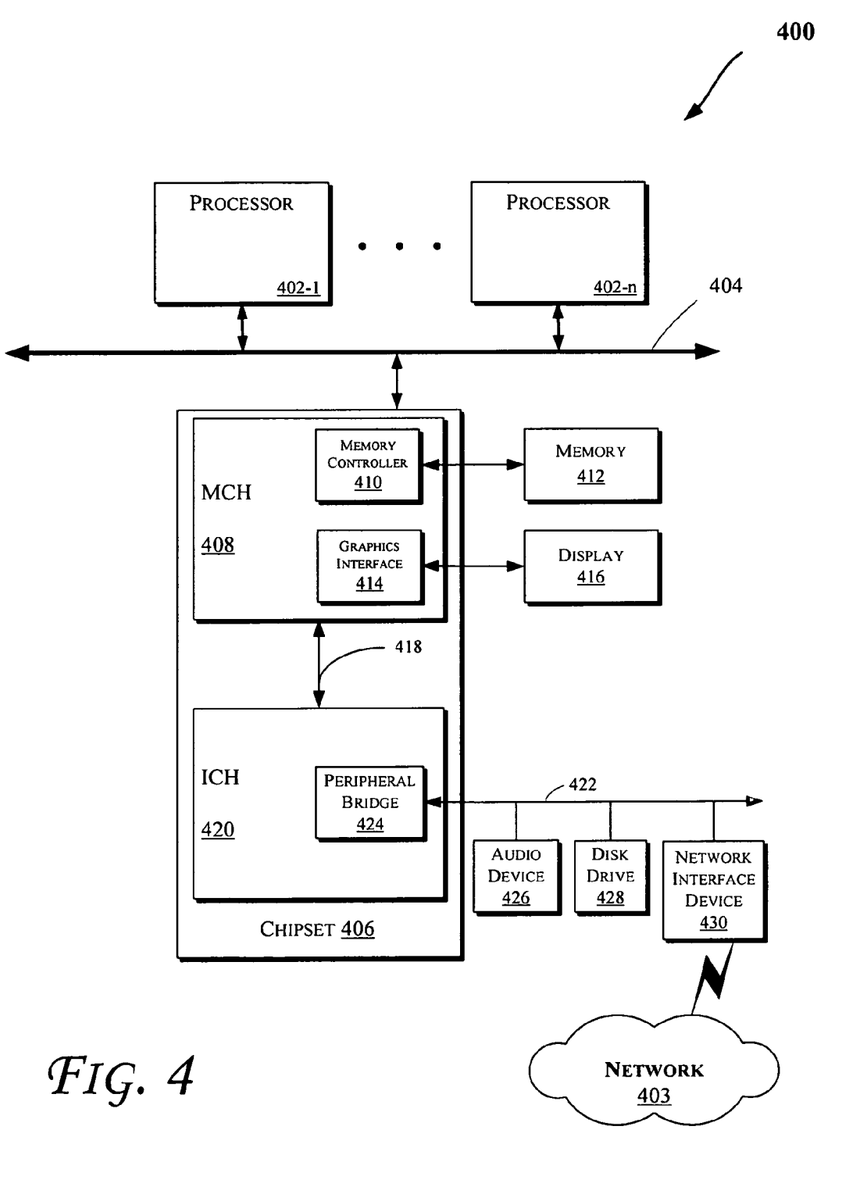
FIGS. 4 and 5 illustrate block diagrams of computing systems in accordance with various embodiments of the invention.

FIG. 4 illustrates a block diagram of a computing system 400 in accordance with an embodiment of the invention. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same IC die (such as dies 100 and 200 of FIGS. 1 and 2). Also, the processors 402 with a multiple core design may be implemented as symmetrical or asymmetrical multiprocessors. In an embodiment, one or more of the processors 402 may be provided on the dies 100 and/or 200 of FIGS. 1 and 2. Also, the operations discussed with reference to FIGS. 1-3 may be performed by one or more components of the system 400.

A chipset 406 may also communicate with the interconnection network 404. The chipset 406 may include a memory control hub (MCH) 408. The MCH 408 may include a memory controller 410 that communicates with a memory 412. The memory 412 may store data, including sequences of instructions, that are executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display device 416. In one embodiment of the invention, the graphics interface 414 may communicate with the display device 416 via an accelerated graphics port (AGP). In an embodiment of the invention, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the MCH 408 and an input/output control hub (ICH) 420 to communicate. The ICH 420 may provide an interface to I/O device(s) that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the MCH 408 via a high speed (e.g., general purpose) I/O bus channel in some embodiments of the invention. In addition, the processor 402 and the MCH 408 may be combined to form a single chip. Furthermore, a graphics accelerator may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
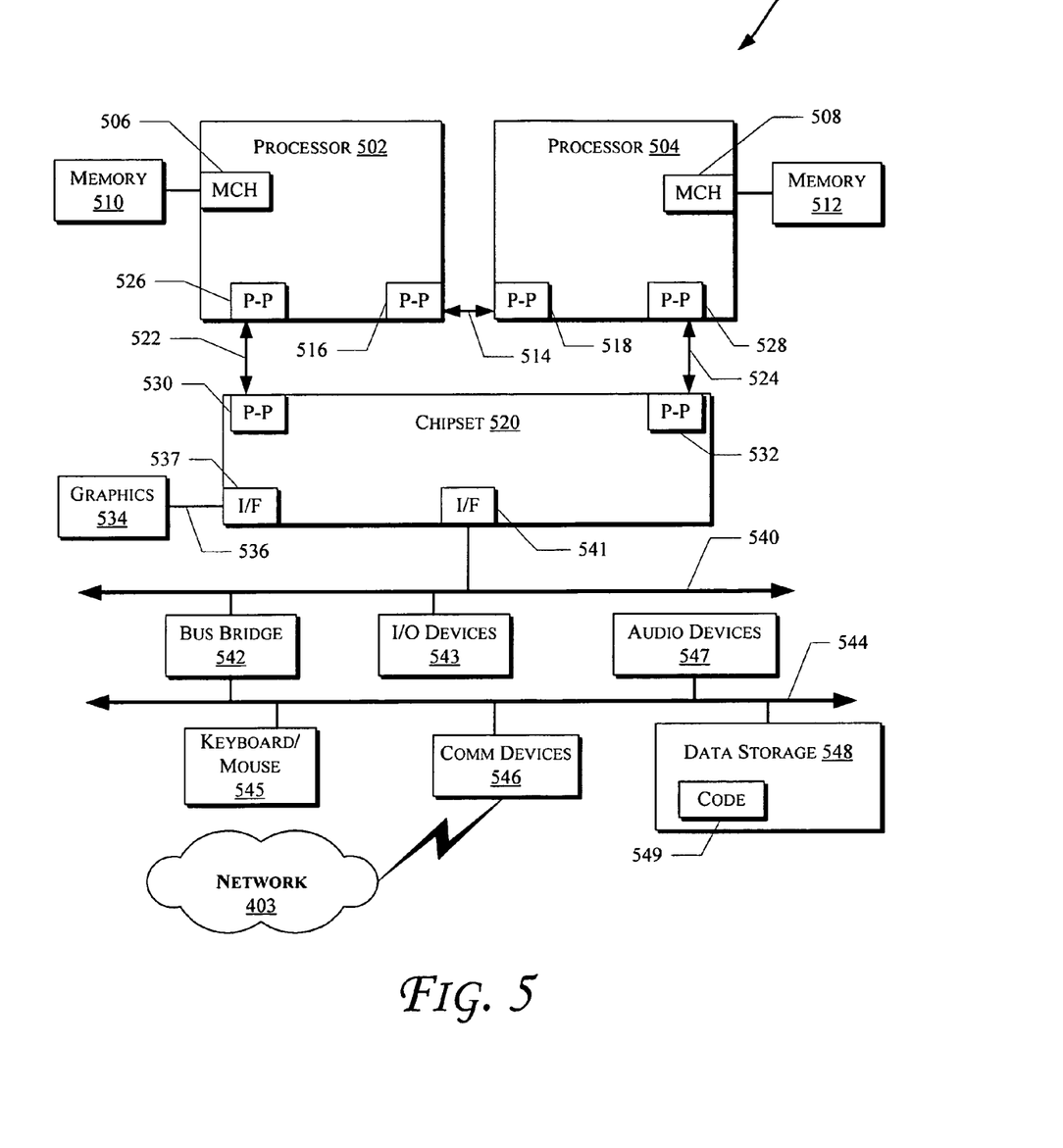

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller (MC) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Further, the processors 502 and 504 may include a high speed (e.g., general purpose) I/O bus channel in some embodiments of the invention to facilitate communication with various components (such as I/O device(s)). Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment of the invention may be provided within the processors 502 and 504. For example, one or more of the components discussed with reference to FIGS. 1-2 may be provided on the dies 100 and 200, respectively, in conjunction with the processors 502 and/or 504. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device 547, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-5.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An integrated circuit die comprising:
   an input to receive power from a power supply that is external to said integrated circuit die;
   a plurality of domains to be coupled to said power supply, wherein each domain includes:
   at least one sensor to sense variations within the domain and power management logic coupled to the at least one sensor, the power management logic to receive sensed variations from the at least one sensor and determine whether the power consumption of the domain is to be modified and generate a signal corresponding to a desired voltage for only that domain; and a power regulator to receive a supply of power from said power supply and adjust a supply of power to the domain based on the signal corresponding to a desired voltage for the domain.

2. The integrated circuit die of claim 1, wherein the signal indicates a change to a target operating frequency of a component within the domain to meet a power consumption target.

3. The integrated circuit die of claim 2, wherein the component comprises one of: a memory, a digital signal processor engine, a coprocessor, a vector processing engine, a floating point processor, a memory controller, an input/output controller, a graphics controller, a network processor, or a graphics processor.

4. The integrated circuit die of claim 1, wherein the power management logic to determines whether the power consumption by the domain is to be modified based on one or more of an efficiency demand or a performance demand.

5. The integrated circuit die of claim 1, wherein the at least one sensor is a voltage sensor.

6. The integrated circuit die of claim 1, wherein the at least one sensor is a temperature sensor.

7. A method comprising:
performing the following for each of a plurality of domains on an integrated circuit, each of the plurality of domains coupled to an external power supply that is external to the integrated circuit:
sensing a variation within a domain using a sensor of the domain;
determining whether power consumption by the domain is to be modified based on the sensed-variation using power management logic of the domain;
the power management logic indicating to a power regulator of the domain that the power consumption of only that domain is to be modified; and
the power regulator adjusting a supply of power provided by the external power supply to the domain in response to the generated signal.

8. The method of claim 7, wherein the signal corresponds to an indication to modify target operating frequencies of the domain.

9. The method of claim 7, wherein adjusting the supply of power comprises adjusting a voltage supplied to the domain in response to the-signal.

10. The method of claim 7, wherein sensing the variation comprises sensing a temperature variation.

11. The method of claim 7, wherein determining whether the power consumption by the domain is to be modified is performed based on efficiency or performance demands.

\* \* \* \* \*